July 7, 1953   D. L. HOFER   2,644,400
CONTROL CIRCUIT FOR EMERGENCY RELIEF VALVE OF A DREDGE
Filed June 24, 1950
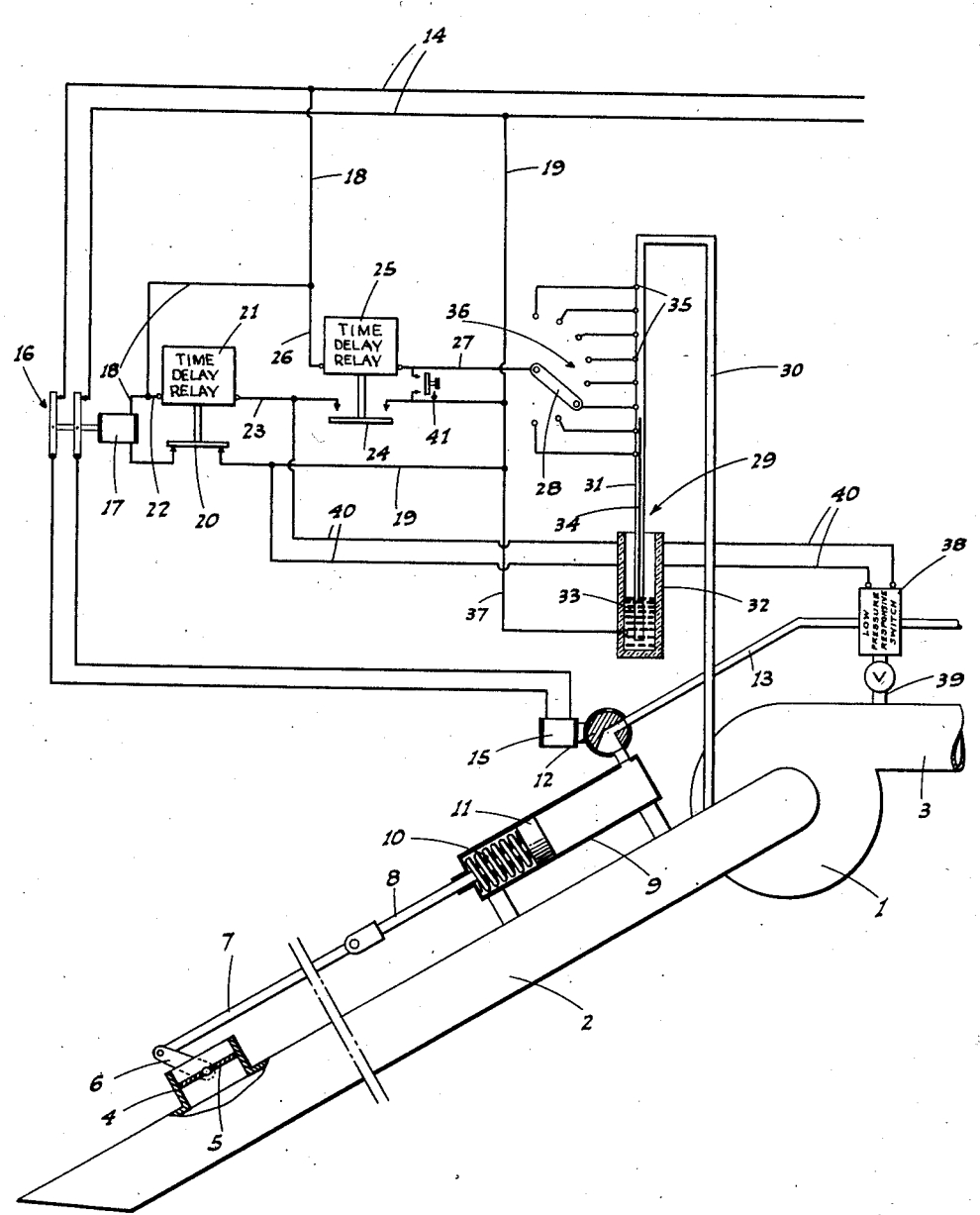
Inventor
David L. Hofer
By
[signature]
ATTORNEYS Patented July 7, 1953

2,644,400

UNITED STATES PATENT OFFICE 2,644,400

CONTROL CIRCUIT FOR EMERGENCY RELIEF VALVE OF A DREDGE

David L. Hofer, Berkeley, Calif.

Application June 24, 1950, Serial No. 170,075

3 Claims. (Cl. 103—11)

The present invention pertains to an improvement in suction dredges equipped with a power actuated relief valve on the suction pipe at an under-water point; such valve being opened to relieve excess vacuum in such pipe resulting from plugging at the intake end thereof.

An electric circuit, responsive to excess vacuum in the suction pipe, is employed to automatically control the power actuated relief valve, and this invention provides—as a major object—an improved circuit for such purpose.

A further object of the invention is to provide a control circuit which is designed to prevent "teetering" or "flutter" with respect to operation of the relief valve, and which otherwise may occur upon momentary—but not dangerous—vacuum rise in the suction pipe.

A time delay relay is employed in the circuit in a manner to delay closing of the relief valve after being opened in response to excessive vacuum in the suction pipe, and it is an additional object of this invention to provide a separate time delay relay in the circuit arranged to delay energization of said first named relay upon momentary excess vacuum, in the suction pipe, causing only a quick make and break of the excess vacuum responsive switch. In this way "teetering" or "fluttering" of the relief valve is prevented, and the latter is opened only in the event the excess vacuum in the suction pipe continues beyond the delay period of the separate time delay relay.

Another object of the invention is to provide a control circuit wherein the fast acting, time delay relay, which causes opening and then delays closing of the relief valve, is responsive—independently of the retarded action time delay relay, to low pressure in the discharge pipe of the dredge.

It is also an object of the invention to provide a control circuit, for the purpose described, which is designed for ease and economy of construction, installation, and maintenance.

Still another object of the invention is to provide a practical and reliable control circuit for an emergency relief valve of a dredge, and yet one which will be exceedingly effective for the purpose for which it is designed.

These objects are accomplished by means of such structure and relative arrangement of parts as fully appear by a perusal of the following specification and claims.

The figure of the drawing is a diagrammatic representation of the novel control circuit.

Referring now more particularly to the characters of reference on the drawing, the numeral 1 indicates the main pump to a suction dredge, and said pump is connected on the intake of a suction pipe 2 which leads under water; the pump discharging through a pipe 3.

At an under-water point the suction pipe 2 is fitted with an emergency relief valve unit 4, of the type which includes a butterfly valve 5 adapted to be operated by a lever arm 6.

The butterfly valve 5 is normally closed and the lever arm 6 is connected by an actuating link 7 to the piston rod 8 of a fluid pressure power cylinder 9 mounted on the suction pipe 2 at a point above the relief valve unit 4.

A heavy-duty compression spring 10 in the power cylinder 9 tends to retract the piston 11 whereby to open the butterfly valve 5. However, the butterfly valve 5 is normally maintained closed by air pressure in the cylinder 9 supplied through a valve 12 from an air pressure conduit 13. The valve 12 is of multi-position type, having a normal position establishing communication between the air pressure conduit 13 and the power cylinder 9, and another position closing the conduit 13 and opening the power cylinder 9 to atmosphere.

With the above arrangement it will be recognized that as long as the valve 12 is in its normal position and the power cylinder 9 subject to air pressure, the piston 11, piston rod 8, and link 7 are advanced, holding the butterfly valve 5 closed.

Under conditions of excessive and dangerous vacuum in the suction pipe 2, resulting from plugging of its lower end, a control circuit is provided for the purpose of then actuating the valve 12 to its position closing the conduit 13 and venting the power cylinder 9 to atmosphere, whence the spring 10 opens the butterfly valve 5 to permit water entry into the suction pipe 2 to relieve such excess vacuum.

The present invention is directed to such control circuit, which comprises the following:

The numeral 14 indicates a main, current supply circuit which leads to a solenoid 15, normally energizing the latter so as to maintain the valve 12 in its normal position, feeding air pressure to the power cylinder 9, as aforesaid.

The current supply circuit 14 has a normally closed master switch 16 therein, and which is maintained in such closed position by an energizing solenoid 17; such solenoid being connected on opposite sides by leads 18 and 19 which extend to the current supply circuit 14.

The lead 19 has a normally closed switch 20 of a time delay relay 21 interposed therein; one side of the relay 21 being connected by a lead 22 to the lead 18, while the other side of the relay 21 is connected by a lead 23 to the lead 19; there being the normally open switch 24 of a separate time delay relay 25 interposed in the lead 23.

On one side the time delay relay 25 is connected by a lead 26 with the lead 18, while the other side of the relay 25 is connected by a lead 27 to the switch blade 28 of a mercury contacting manometer, indicated generally at 29. The mercury contacting manometer 29 includes a conduit 30 connected to the suction pipe 2 adjacent the pump 1, and having a vertical tube 31 of dielectric material which extends into a reservoir 32 having a quantity of mercury 33 therein; the mercury 33, in response to vacuum in the suction pipe 2, rising and falling as a mercury column 34 in the tube 31.

A plurality of vertically spaced contact points 35 are exposed within the tube 31, and the switch blade 28 is adapted for selective electrical connection with the contact points 35 by means of a switch assembly 36. To complete the circuit for the time delay relay 25, a lead 37 connects between the mercury 33 in reservoir 32 and the lead 19.

The time delay relay 21 is of the type wherein the predetermined delay begins after the relay is deenergized, whereas the time delay relay 25 is of the type wherein the predetermined delay begins when the relay is energized.

With these two relays of the type described, and in circuit as above, the circuit functions as follows:

Upon plugging of the suction pipe 2 occurring, and causing dangerous excess vacuum in the suction pipe 2 for other than a moment, the mercury contacting manometer 29 acts as a switch, closing the circuit for the time delay relay 25.

However, for the preselected period for which the relay 25 may be set, it delays closing of the switch 24, and then such switch closes, completing the circuit for the time delay relay 21, which immediately acts to open the switch 20.

Upon switch 20 opening, the circuit for the solenoid 17 is broken and the latter is deenergized, whereupon the master switch 16 opens, deenergizing the solenoid 15. When the solenoid 15 deenergizes, the valve 12 is reversed in position, and the power cylinder 9 is vented to atmosphere, as previously described. At this time the spring 10 acts on the piston 11 to cause opening of the butterfly valve 5, and the excess vacuum is relieved.

When the excess vacuum is relieved, the mercury contacting manometer 29 breaks the circuit for the time delay relay 25, resulting in switch 24 returning to its normally open position, and deenergizing the time delay relay 21. However, as the relay 21 is of a type wherein the preselected delay does not start until the relay is deenergized, the switch 20 is held from its return to normal closed position for the period of such delay. After such period the switch 20 closes, solenoid 17 is energized, and master switch 16 closes, whereupon solenoid 15 returns valve 12 to its normal position, with air pressure supplied to the power cylinder 9 to close the butterfly valve 15 and maintain it in such position.

The prime advantage of the relays 21 and 25, of the type and in the circuit arrangement described, is the fact that the relay 25 is effective to prevent the control circuit from causing teetering or flutter of the butterfly valve 5 in response to only momentary or "flash" excessive vacuum in the suction pipe 2, causing the mercury column 34 to quick fluctuate up and down in the mercury contacting manometer 29. When this occurs the mercury contacting manometer 29 momentarily closes the circuit for the time delay relay 25, but as the latter is of a type which delays closing of the switch 24 when the relay is energized, the time delay relay 21 remains unaffected. In other words, the mercury contacting manometer 29 must remain in closing relation to the circuit for the time delay relay 25 longer than its preselected delay before such relay will function to close the switch 24, and in turn to cause closing of the switch 20 by the relay 21.

In effect, the time delay relay 25 serves to "damp" reaction in the remainder of the control circuit in response to momentary fluctuation or quick up and down travel of the mercury column 34.

The circuit is thus operative to provide a positive and effective control of the power mechanism which operates the relief valve; the control being smooth and reliable, but non-responsive to inconsequential vacuum increases in the suction pipe.

Under certain working conditions low pressure occurs in the discharge pipe 3, and at such time it is also desirable to automatically open the butterfly valve 5 without the delay of the relay 25. This is accomplished as follows:

A low pressure responsive switch 38 is connected by a valved conduit 39 to the discharge pipe 3, and a circuit 40 leads from switch 38 to connection with leads 19 and 23. The switch 38 is normally open, but upon occurrence of undesirable and predetermined low pressure in the discharge pipe 3, said switch closes. When switch 38 closes, the circuit 40 completes the circuit for the relay 21 between leads 18 and 19.

Upon the relay 21 being energized it breaks the circuit for solenoid 17, and the evident train of action results to open the butterfly valve 5. As soon as the low pressure condition is remedied, the circuit for relay 21 is again broken, and—after the delay which then begins—the switch 20 closes to reestablish a normal condition in the circuit with the relief valve unit 4 closed.

The numeral 41 is a manual test switch wired in a manner to complete the circuit for the time delay relay 25 whereby the entire circuit may be tested when desired.

From the foregoing description it will be readily seen that there has been produced such a system as substantially fulfills the objects of the invention as set forth herein.

While this specification sets forth in detail the present and preferred construction of the system, still in practice such deviations therefrom may be resorted to as do not form a departure from the spirit of the invention, as defined by the appended claims.

Having thus described the invention, the following is claimed as new and useful, and upon which Letters Patent are desired:

1. In a dredge suction pump and pipe unit having a normally closed vacuum relief valve in the pipe, means tending to open the valve, normally active power means to hold the valve closed and means to shut off the power means; electric control means to actuate said shut-off means upon the existence of abnormal vacuum conditions in the pipe, said control means comprising an electric device to operate the shut-off means, a circuit in which the device is interposed including a normally closed switch, electric means to control opening of said switch, means to actuate said electric means upon excess vacuum conditions obtaining in the pipe beyond the pump, and additional means to actuate said electric means upon low pressure conditions obtaining in the pipe ahead of the pump.

2. In a dredge suction pipe having a normally closed vacuum relief valve therein, means tending to open the valve, normally active power means to hold the valve closed and means to shut off and relieve the power means; an electric control system to actuate said shut-off means upon the existence of excessive vacuum in the pipe, said system comprising an electric device to operate said shut-off means, a circuit in which the element is interposed including a normally closed switch, an electric element to hold the switch closed, a normally closed circuit in which said element is interposed, a normally closed time-delay relay switch in said last named circuit, a circuit for the relay of said relay switch, a normally open time-delay relay switch in the last named circuit, and a normally open circuit for the relay of the last named switch arranged to be closed upon the existence of excess vacuum conditions in the pipe.

3. A control system as in claim 2, in which the time delay action of the first named relay starts upon de-energization of such relay, while the time delay action of the last named relay starts upon energization of said relay.

DAVID L. HOFER.

References Cited in the file of this patent

UNITED STATES PATENTS

| Number | Name | Date |
|---|---|---|
| 846,897 | Benjamin | Mar. 12, 1907 |
| 913,180 | Wyman | Feb. 23, 1909 |
| 1,493,064 | Brasington | May 6, 1924 |
| 1,510,161 | Raymond | Sept. 30, 1924 |
| 1,871,163 | Dilworth | Aug. 9, 1932 |
| 1,999,811 | Holt | Apr. 30, 1935 |
| 2,250,021 | Hofer | July 22, 1941 |
| 2,393,201 | Stafford | Jan. 13, 1946 |